US006500338B2

(12) United States Patent
Baah

(10) Patent No.: US 6,500,338 B2
(45) Date of Patent: Dec. 31, 2002

(54) FUEL FILTER AND DRYER

(76) Inventor: Richard A. Baah, 615 Banks Ave., Knoxville, TN (US) 37917

( * ) Notice: Subject to any disclaimer, the term of this patent is extended or adjusted under 35 U.S.C. 154(b) by 26 days.

(21) Appl. No.: 09/849,875

(22) Filed: May 7, 2001

(65) Prior Publication Data

US 2002/0162777 A1 Nov. 7, 2002

(51) Int. Cl.$^7$ .......................... B01D 24/18; B01D 36/02
(52) U.S. Cl. ...................... 210/266; 210/289; 210/311; 210/317; 210/320; 210/446; 210/502.1; 210/DIG. 6
(58) Field of Search ................................ 210/266, 311, 210/316, 317, 320, 435, 446, DIG. 6, 289, 502.1

(56) References Cited

U.S. PATENT DOCUMENTS 2,569,243 A * 9/1951 Kovacs ........................ 210/446
4,795,556 A * 1/1989 Brotea et al. ................ 123/510

* cited by examiner

Primary Examiner—Matthew O. Savage

(57) ABSTRACT

A fuel filter/dryer having a casing, and the casing having an inlet and an outlet. At least a portion of the casing is filled with a desiccant through which the fuel flows. Also within the casing, is a particulate filter which removes harmful particles from the fuel. The desiccant is of a type that changes color when saturated with water. The casing is transparent to allow the change in color to be viewed in order to ascertain whether or not the fuel filter/dryer needs replacement.

12 Claims, 3 Drawing Sheets

US 6,500,338 B2

FUEL FILTER AND DRYER

BACKGROUND OF THE INVENTION

1. Field of the Invention

The present invention relates to fuel filter/dryer for incorporation in the fuel system supplying a fuel consuming device such as an engine, heater, burner, furnace, etc.

2. Description of the Prior Art

Fuel systems in almost all motor vehicles, incorporate at least one particulate filter to filter out fine particles from the fuel flowing through the fuel system. Such fine particles could have disastrous consequences for the operation of the engines in motor vehicles because they can potentially obstruct the narrow passages in fuel injectors and/or carburetors; and if these particles do find their way into the engine, they can cause unnecessary wear and damage to engine parts. In addition to being contaminated by particulate matter, commercially sold fuel is also contaminated with water. This water presents a problem especially in winter time, because it can lead to fuel line freeze-up. Fuel additives are currently available on the market, which are added directly to the fuel in the fuel tank in order to "dry" the fuel. These additives however get consumed along with the fuel, and may adversely affect the performance of the engine and or shorten engine life. The present invention combines a particulate filter with a desiccant that remains separate from the fuel. Therefore, the present invention provides the benefits of removing particulate matter and water from the fuel, without adversely affecting the performance obtained from the fuel. None of the prior art shows the combination of a fuel filter and a bed of granular desiccant material in a single unit. Further, none of the prior art shows the system of baffles and mesh screens used in the present invention.

U.S. Pat. No. 2,536,274, issued to Richard S. Gaugler Jan. 2, 1951, shows a desiccant cartridge for use refrigeration equipment. The desiccant cartridge of Gaugler made of desiccant granules contained in a woven mesh sleeve Gaugler does not show the combination of a fuel filter and desiccant bed in a single unit.

U.S. Pat. No. 3,029,581, issued to Hugh C. Robbins on 20 Apr. 17, 1962, shows a desiccant cartridge having an inner tube located concentrically within an outer tube. The desiccant housed in the inner tube and is held in place by wads of glass-wool referred to as filter discs. The desiccant cartridge of Robbins is intended for drying gases. Robbins does not show the combination of a fuel filter and a desiccant bed in a single unit. Further, Robbins does not show the system of baffles and mesh screens used in the present invention.

U.S. Pat. No. 3,246,758, issued to William Wagner on 5 Apr. 19, 1966, shows a plug with a viewing window and a chemical moisture indicator used for determining the moisture content of a desiccant material. Wagner does not show the combination of a fuel filter and a desiccant bed in a single unit.

U.S. Pat. No. 3,505,783, issued to Harold E. Graham on 10 April 14, 1970, shows a transparent cylindrical housing containing an "adsorbent" material. Graham does not show the combination of a fuel filter and a desiccant bed in a single unit.

U.S. Pat. No. 3,705,480, issued to Wallace M. Wireman on Dec. 12, 1972, shows a desiccant cartridge having a filter in series with a color-changing desiccant bed. The desiccant cartridge of Wireman is intended for drying gases. Wireman does not show the combination of a liquid fuel filter and a desiccant bed in a single unit. Further, Wireman does not show the system of baffles and mesh screens used in the present invention:

U.S. Pat. No. 3,724,177, issued to George A. Grote on Apr. 3, 1973, shows a cartridge for filtering gases. The cartridge of Grote includes a bed of pulverulent material positioned between layers of cotton. Grote does not show the combination of a fuel filter and a desiccant bed in a single unit. Further, Grote does not show the system of baffles and mesh screens used in the present invention.

U.S. Pat. No. 4,236,902, issued to Roy A. Fricke on Dec. 2, 1980, shows an air purifying apparatus having a filter and a bed of absorber material. The absorber material of Fricke is intended to remove pollution such as tobacco smoke from the air and is not a drying agent. Fricke does not show the combination of a fuel filter and a desiccant bed in a single unit.

U.S. Pat. No. 4,259,097, issued to Amrut R. Patel et al. 10 on March 31, 1981, shows an oil and desiccant filter for a gas. Patel et al. do not show the combination of a fuel filter and a desiccant bed in a single unit. Further, Patel et al. do not show the system of baffles and mesh screens used in the present invention.

U.S. Pat. No. 4,746,338, issued to Clifford C. B. Williams on May 24, 1988, shows a gas filter having a first section which contains a desiccant and a second section which contains activated charcoal. Williams does not show the combination of a fuel filter and a desiccant bed in a single unit. Further, Williams does not show the system of baffles and mesh screens used in the present invention.

U.S. Pat. No. 4,853,123, issued to Mark B. Hays et al. on Aug. 1, 1989, shows a fuel filter having micron sized pores that filter out aqueous and particulate contaminants. Hays et al. do not show the combination of a fuel filter and a desiccant bed in a single unit. Further, Hays et al. do not show the system of baffles and mesh screens used in the present invention.

U.S. Pat. No. 5,017,285, issued to Leon P. Janik et al. on May 21, 1991, shows a fuel filter having a two stage filter, with the second stage acting as a water barrier. The trapped water is collected in a sump. Janik et al. do not show the combination of a fuel filter and a desiccant bed in a single unit. Further, Janik et al. do not show the system of baffles and mesh screens used in the present invention.

U.S. Pat. No. 5,879,543, issued to Bijan Amini on Mar. 9, 1999, shows a filter element composed of non-metallic material and water sensor used to detect presence of water in the fuel, which generates a signal that engages a pump to remove a quantity of separated water from the filter housing. Amini does not show the combination of a fuel filter and a desiccant bed in a single unit. Further, Amini does not show the system of baffles and mesh screens used in the present invention.

U.S. Pat. No. 5,916,442, issued to David Paul Goodrich on Jun. 29, 1999, shows a fuel filter assembly for removing water from a fuel under pressure with a filter media positioned within sleeve members. An accumulation chamber and an outer valve provide the ability to drain unwanted fluid from the fuel. Goodrich does not show the combination of a fuel filter and a desiccant bed in a single unit. Further, Goodrich does not show the system of baffles and mesh screens used in the present invention.

U.S. Pat. No. 5,993,675, issued to Albert P. Hagerthy on Nov. 30, 1999, shows a filter for separating water from fuel in marine and diesel engines. The filter elements are constructed from multiple adjacent microfibers layers bonded to each other which allows the passage of fuel while substantially limiting the passage of water. Hagerthy does not show the combination of a fuel filter and a desiccant bed in a single unit. Further, Hagerthy does not show the system of baffles and mesh screens used in the present invention.

U.S. Pat. No. 6,224,439, issued to Sato, et al. On May 1, 2001, shows a fuel filter having a water accumulation detection ability. The water detecting mechanism is placed under the filter body made of transparent material. Sato at al. Do not show the combination of a fuel filter and desiccant bed in a single unit. Further, Sato et al. do not show the system of baffles and mesh screens used in the present invention.

European Patent Application Number 0 162 022 A2, by Maria Cristina Cantoni dated Nov. 21, 1985, shows an air filter for automotive air conditioning units. Cantoni does not show the combination of a fuel filter and a desiccant bed in a single unit.

United Kingdom Patent Document Number 343,105, by Richard Lant et al. dated Mar. 12, 1931, is directed to the use of higher fatty acid esters of cellulose as a filter material for removing water from organic liquids. Lant et al. do not show the combination of a fuel filter and a desiccant bed in a single unit United Kingdom Patent Document Number 971,230, by Hugh C. Robbins dated Sept. 30, 1964, shows a cylindrical canister containing a desiccant material. Robbins '230 does not show the combination of a fuel filter and a desiccant bed in a single unit. Further, Robbins '230 does not show the system of baffles and mesh screens used in the present invention.

United Kingdom Patent Application Number 2 030 886 A, by Eric John Hayward dated Apr. 16, 1980, shows a filter canister for holding a granular medium for the absorption of carbon dioxide during anaesthesia. Hayward does not show the combination of a fuel filter and a desiccant bed in a single unit.

United Kingdom Patent Application Number 2 035 833, by Vaclav Sebor dated Jun. 25, 1980, shows a filter apparatus including a glass fiber filter element and a silica gel or activated carbon absorber, for filtering gases. Sebor does not show the combination of a fuel filter and a desiccant bed in a single unit. Further, Sebor does not show the system of baffles and mesh screens used in the present invention.

United Kingdom Patent Application Number 2 080 697 A, by Barry W. Dinius dated Feb. 10, 1982, shows a filter/dehydrator including water absorbing cellulosic fibers in series with a filter element. Dinius does not show the combination of a fuel filter and a desiccant bed in a single unit. Further, Dinius does not show the system of baffles and mesh screens used in the present invention. None of the above inventions and patents, taken either singly or in combination, is seen to describe the instant invention as claimed.

SUMMARY OF THE INVENTION

The present invention is directed to a fuel filter/dryer having a casing, and the casing having an inlet and an outlet. At.least a portion of the casing is filled with a desiccant through which the fuel flows. Also within the casing, is a particulate filter which removes harmful particles from the fuel. The desiccant is of a type that changes color when saturated with water. The casing is transparent to allow the change in color to be viewed in order to ascertain whether or not the fuel filter/dryer needs replacement.

Accordingly, it is a principal object of the invention to provide a combined fuel filter and dehydrator for use in fuel systems.

It is another object of the invention to provide a combined fuel filter and dehydrator having a desiccant which remains separate from the fuel.

It is a further object of the invention to provide a combined filter/dehydrator having a color-changing desiccant so that a user can readily ascertain, by inspection, whether or not the filter/dehydrator needs replacement.

Still another object of the invention is to provide a combined filter/dehydrator having a transparent casing.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
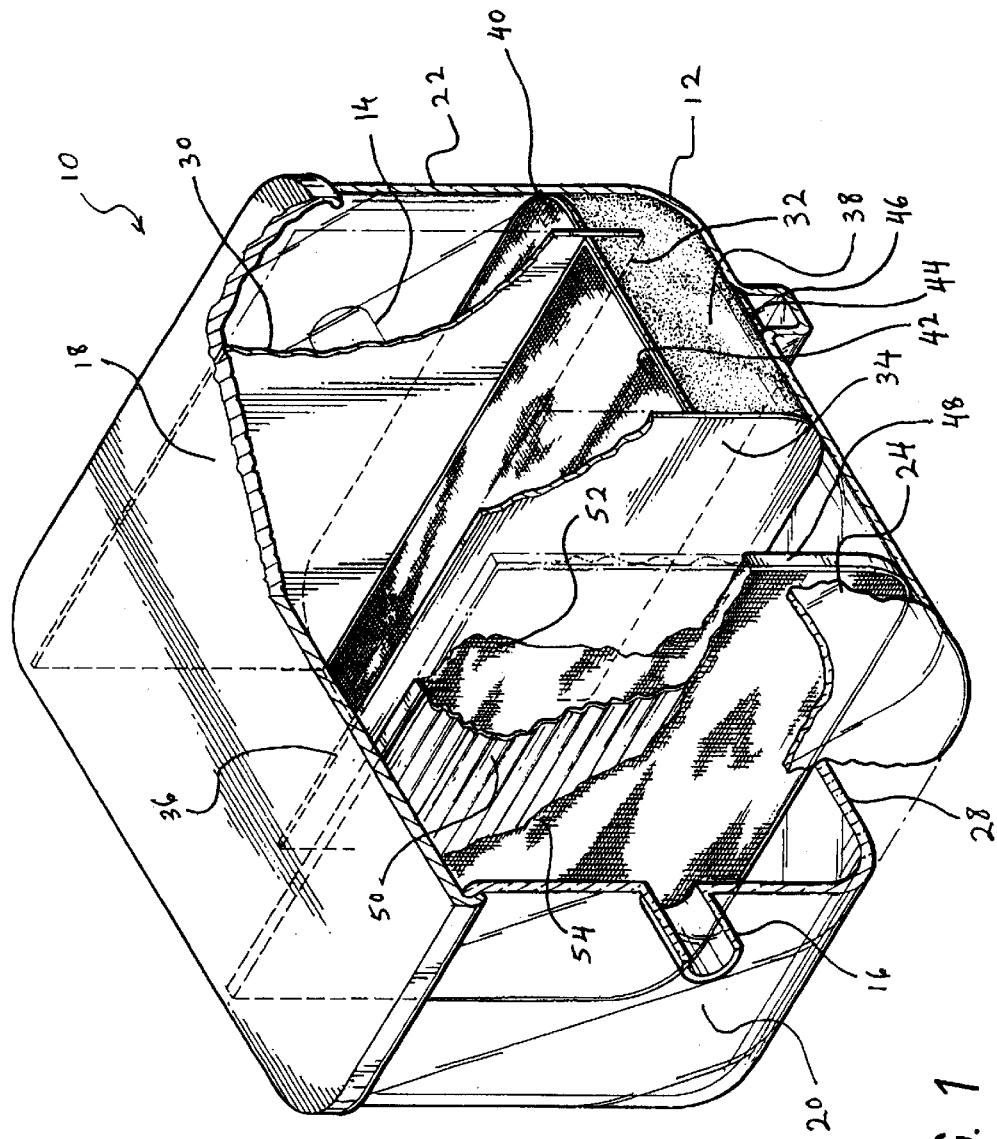
FIG. 1 is a perspective view of the filter/dryer of the present invention partially broken away to reveal internal detail.
Figure 2:
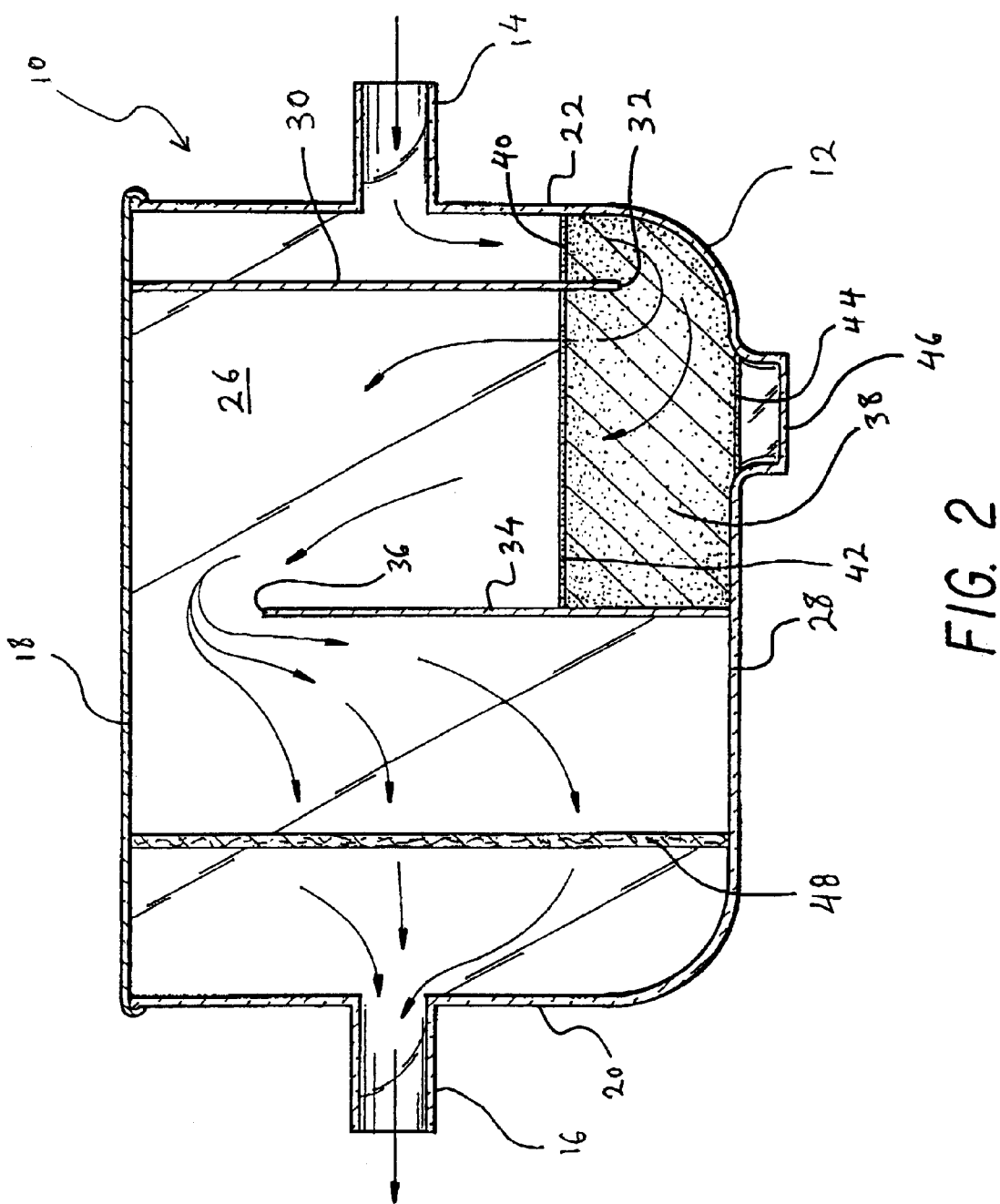
FIG. 2 is a cross sectional view of the filter/dryer of the present invention showing the path of fuel flow through the filter/dryer.

Referring to FIGS. 1 and 2, the present invention is directed 20 to a fuel filter/dryer cartridge 10, also referred to herein as a filter/dehydrator. The cartridge 10 includes a substantially boxlike casing 12 having an inlet conduit 14 and an outlet conduit 16. The casing 12 has an open top which is sealed by a lid 18. The lid 18 can be permanently fixed in place for a disposable cartridge, or be detachable for a rebuildable cartridge. In both cases, the lid 18 must provide an airtight closure for the open top of casing 12. The lid can be sealingly fixed over the open top of casing 12 by any well known means including using an adhesive to fix the lid 18 in place, heat pressing lid 18 in place, and clamping the lid 18 in place.

The box-like casing 12 is formed by five walls, a front wall 20, a back wall 22, a left wall 24, a right wall 26, and a bottom wall 28. The inlet conduit 14 is centrally located in the back wall 22, while the outlet conduit 16 is centrally located in the front wall 20. The hollow bores of the inlet conduit 14 and the outlet conduit 16 are in communication with the interior of the casing 12.

Down stream of the inlet conduit 14 is a first baffle 30. The baffle 30 sealingly abuts the lid 18, the left wall 24, and the right wall 26. The baffle 30 extends, as a sheet, from the lid 18 and terminates at an edge 32. The edge 32 is spaced apart from the bottom 28. The baffle 30 can be molded in one piece with the casing 12, or it can be fixed to walls 24 and 26 using adhesives or heat fusion. The top edge of the baffle 30 must be sealed against the lid 18 to ensure that all flow through the cartridge 10 passes between the bottom edge 32 of the baffle 30 and the bottom wall 28. The top edge of the baffle 30 can be sealed against the lid using any well known means including adhesives, sealants, sealing strips, or heat fusion.

Down stream of the baffle 30 is a second baffle 34 baffle 34 sealingly abuts the bottom 28, the left wall 24, and the right wall 26. The baffle 34 extends, as a sheet, from the bottom 28 and terminates at a top edge 36. The edge 36 is spaced apart from the lid 18. The baffle 34 can be molded in one piece with the casing 12, or it can be fixed to wall 24, wall 26, and bottom 28 using adhesives or heat fusion. All flow through the cartridge 10 passes between the top edge 36 of the baffle 34 and the lid 18.

The baffles 30 and 34 direct the flow of fuel, flowing through the cartridge 10, through a bed of desiccant 38. The desiccant is a granular solid, preferably calcium sulfate (CaSO4). The calcium sulfate removes water from the fuel flowing through the cartridge 10. Fine wire mesh screens 40, 42, and 44 confine desiccant granules within a well defined region of the casing 12, and are used to prevent the desiccant granules from being dislodged by the force of the fuel flowing through the granules. Also mesh screens 40, 42, and 44 keep the desiccant granules tightly packed so that the formation of empty channels through desiccant bed is avoided, thus ensuring intimate contact between the fuel and the desiccant granules.

The mesh screen 40 extends across the flow area defined by the wall 24, the wall 26, the back wall 22, and the baffle 30. The mesh screen 42 extends across the flow area defined by the wall 24, the wall 26, the baffle 34, and the baffle 30. The mesh screen 44 extends across the open top of a trough 46 formed in the bottom 28. The trough 46 is positioned under the desiccant bed 38, extending along the full width of the cartridge 10, and is intended as a 10 short-term repository for water once the desiccant becomes saturated with water.

Positioned intermediate the baffle 34 and the outlet conduit 16, is a particulate filter 48. The filter 48 extends across the flow area defined by the lid 18, the bottom 28, the wall 26, and the wall 24 such that all flow through the casing 12 must pass through the filter 48. The filter 48 can be of any well known type and is intended to filter out fine particles from the fuel flowing through the cartridge 10. Such fine particles could have detrimental effects in the apparatuses, such as an engine, in which the fuel is used. In the illustrated example, the filter 48 is composed of a corrugated paper filter element 50 sandwiched between two supporting mesh screens 52 and 54 (see FIG. 1). After passing through the filter 48, clean, dry fuel then flows to the outlet conduit 16.

Figure 3:
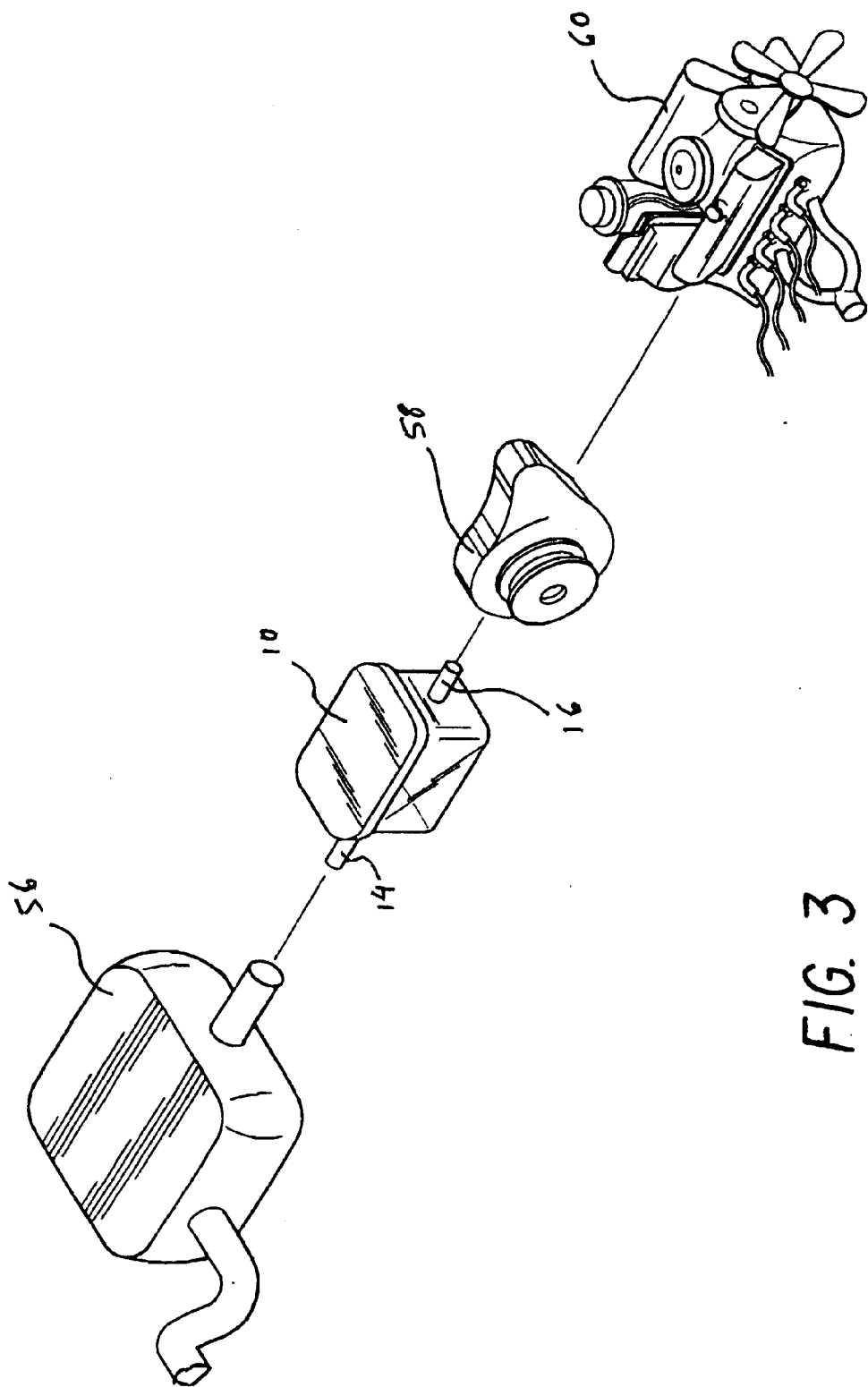
FIG. 3 is a schematic view showing the filter/dryer of the 15 present invention incorporated into an automotive fuel system.

Referring to FIG. 3, the filter/dryer cartridge 10 is seen incorporated into an automotive fuel system. The fuel system includes a fuel tank 56, the filter/dryer cartridge 10, a fuel pump 58, and an engine 60. The filter/dryer cartridge 10 is spliced into the fuel line (not shown) between the fuel tank 56 and the fuel pump 58. In this arrangement therefore, a first portion of the fuel line will provide for fluid communication between the fuel tank 56 and the inlet conduit 14, while a second portion of the fuel line will provide for fluid communication between the outlet conduit 16 and the fuel pump 58.

The calcium sulfate desiccant 38 changes color, turning from white to blue, as it becomes saturated with water. Once all the desiccant changes color, the desiccant is completely saturated and is no longer effective in removing water from the fuel; therefore necessitating the replacement of the cartridge 10. The casing 12 is made of a transparent plastic so that the change in color of the desiccant will be readily visible. Therefore, it can be easily determined, by mere inspection, whether or not it is time to replace the filter/dryer cartridge 10. It should be noted that the present invention is not intended to be limited to having calcium sulfate as the desiccant, and that many other desiccant materials are also suitable for use in the present invention. In addition, the desiccant used in the present invention may be a composition including a desiccant material and a color-changing moisture indicator.

It is to be understood that the present invention is not limited to the sole embodiment described above, but encompasses any and all embodiments within the scope of the following claims.

I claim:

1. A filter/drier cartridge for use in a fuel supply line, said filter/dryer cartridge comprising:

a casing having an interior, said casing having an inlet communicating with said interior and an outlet communicating with said interior;

desiccant material filling at least a portion of said interior, said desiccant material acting to remove water from fuel flowing through said filter/dryer cartridge;

a filter element position in said interior intermediate said desiccant material and said outlet, said desiccant material and said filter element being arranged within said casing such that all fuel flowing through said filter/dryer cartridge must pass through said desiccant material and said filter element;

wherein said casing has a bottom, a front wall, a back wall, a left wall, a right wall, and an open top, said inlet being formed in said back wall, and said outlet being formed in said front wall, said filter/dryer cartridge further including a lid acting as a closure for said open top;

a first baffle lying in a plane parallel to said back wall, said first baffle being positioned intermediate said back wall and said front wall, said first baffle sealingly abutting said lid, said left wall, and said right wall, said first baffle extends as a sheet from said lid to a bottom edge, said bottom edge being spaced apart from said bottom such that all fuel flowing through said filter/dryer cartridge must pass between said bottom edge and said bottom;

a second baffle lying in a plane parallel to said first baffle, said second baffle being positioned intermediate said first baffle and said front wall, said second baffle sealingly abutting said bottom, said left wall, and said right wall, said second baffle extends as a sheet from said bottom to a top edge, said top edge being spaced part from said lid such that all fuel flowing through said filter/dryer cartridge must pass between said top edge and said lid;

a first mesh screen extending across a flow area defined by said left wall, said right wall, said back wall, and said first baffle; and a second mesh screen extending across a flow area defined by said left wall, said right wall, said first baffle, and said second baffle, said desiccant material being contained in a space enclosed by said bottom, said left wall, said right wall, said second baffle, said first mesh screen, said second mesh screen, and said first baffle, said filter element extending across a flow area defined by said lid, said bottom, said right wall, and said left wall.

2. The filter/dryer cartridge according to claim 1, wherein said desiccant material has a color and said color changes from a first color to a second color as said desiccant material becomes saturated with water.

3. The filter/dryer cartridge according to claim 2, wherein said casing is transparent, whereby changing of said color can be viewed by a user.

4. The filter/dryer cartridge according to claim 3, wherein said desiccant material includes calcium sulfate.

5. The filter/dryer cartridge according to claim 1, wherein said casing is transparent.

6. The filter/dryer cartridge according to claim 1, wherein said desiccant material includes calcium sulfate.

7. The filter/dryer cartridge according to claim 1, further including:

a trough formed in said bottom, said trough extending from said left wall to said right wall and said trough having an open top communicating with said interior, said trough being positioned under said desiccant material, said trough acting as a storage for excess water after said desiccant material is completely saturated; and a third mesh screen covering said open top of said trough to thereby prevent said desiccant material from falling into said trough.

8. The filter/dryer cartridge according to claim 7, wherein said desiccant material is a granular solid and is tightly packed into said space enclosed by said bottom, said left wall, said right wall, said second baffle, said first mesh screen, said second mesh screen, and said first baffle.

9. The filter/dryer cartridge according to claim 8, wherein said filter element includes a paper filter.

10. The filter/dryer cartridge according to claim 9, wherein said desiccant material has a color and said color changes from a first color to a second color as said desiccant material becomes saturated with water.

11. The filter/dryer cartridge according to claim 10, wherein said casing is transparent, whereby changing of said color can be viewed by a user.

12. The filter/dryer cartridge according to claim 11, wherein said desiccant material includes calcium sulfate.

* * * * *